United States Patent
Liu et al.

(10) Patent No.: US 9,739,308 B2
(45) Date of Patent: Aug. 22, 2017

(54) MAGNETIC BEARING ARRANGEMENT AND METHOD OF OPERATING A MAGNETIC BEARING ARRANGEMENT

(71) Applicant: ABB Schweiz AG, Baden (CH)

(72) Inventors: Bin Liu, Västerås (SE); Johan Sjöberg, Västerås (SE)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 15/128,875

(22) PCT Filed: Mar. 26, 2015

(86) PCT No.: PCT/EP2015/056583
§ 371 (c)(1),
(2) Date: Sep. 23, 2016

(87) PCT Pub. No.: WO2015/158520
PCT Pub. Date: Oct. 22, 2015

(65) Prior Publication Data
US 2017/0122372 A1 May 4, 2017

(30) Foreign Application Priority Data
Apr. 14, 2014 (EP) .................................... 14164597

(51) Int. Cl.
*H02K 7/08* (2006.01)
*H02P 23/00* (2016.01)
(Continued)

(52) U.S. Cl.
CPC ...... *F16C 32/0457* (2013.01); *F16C 32/0446* (2013.01); *F16C 32/0451* (2013.01); *F16C 32/0474* (2013.01)

(58) Field of Classification Search
CPC .................................. H02K 7/09; F16C 39/06
(Continued)

(56) References Cited

U.S. PATENT DOCUMENTS 5,666,013 A 9/1997 Mizuno
6,078,119 A * 6/2000 Satoh .................. F16C 32/0444
310/179
(Continued)

FOREIGN PATENT DOCUMENTS

| JP | 2005006432 A | 1/2005 |
| JP | 2010200524 A | 9/2010 |
| WO | 2013152061 A2 | 10/2013 |

OTHER PUBLICATIONS

International Search Report & Written Opinion of the International Searching Authority Application No. PCT/EP2015/056583 completed: Jun. 11, 2015;Mailing Date: Jun. 20, 2015 11 pages.

*Primary Examiner* — Jose Gonzalez Quinones
(74) *Attorney, Agent, or Firm* — Whitmyer IP Group LLC

(57) ABSTRACT

An electromagnetic bearing arrangement for a rotating equipment includes an electromagnet; an amplifier arrangement based on IGBT (Insulated-Gate Bipolar Transistor) switches; a power supply; a controller; and a position sensor. The controller includes a position control module and a direct force control module, the position sensor is operatively connected to the control module to calculate a force reference ($F_{ref}$) based on the measured position of the rotating equipment. The electromagnetic bearing arrangement includes a sensor for measuring at least one parameter ($i_u$, $i_d$) indicative of a force exerted by the electromagnet to calculate an estimated force ($F_{cal}$), to compare the force reference with the estimated force, and to control the amplifier.

15 Claims, 2 Drawing Sheets

(51) Int. Cl.
*H01F 38/00* (2006.01)
*F16C 32/06* (2006.01)
*F16C 32/04* (2006.01)

(58) Field of Classification Search
USPC .......... 310/90.5; 361/143; 318/799; 384/103
See application file for complete search history.

(56) References Cited

U.S. PATENT DOCUMENTS

| | | | |
|---|---|---|---|
| 6,259,179 B1 * | 7/2001 | Fukuyama | F16C 32/0451 310/90.5 |
| 6,359,356 B1 * | 3/2002 | Hayashi | F16C 32/0482 310/90.5 |
| 6,515,387 B1 * | 2/2003 | Shinozaki | F16C 32/0451 310/90.5 |
| 6,965,181 B1 * | 11/2005 | Heshmat | F16C 17/024 310/90.5 |
| 8,115,358 B1 | 2/2012 | Rakov | |
| 2009/0189469 A1 * | 7/2009 | Barada | F16C 32/0448 310/90.5 |

* cited by examiner

MAGNETIC BEARING ARRANGEMENT AND METHOD OF OPERATING A MAGNETIC BEARING ARRANGEMENT

TECHNICAL FIELD

The invention relates generally to magnetic bearing arrangements and to methods of operating such magnetic bearing arrangements.

BACKGROUND

Active magnetic bearings are used to suspend shafts of rotating equipment subject to load spectra which vary with respect to time. Control of the position of the rotating assemblies of such equipment is effectuated by electromechanical systems which combine the use of feedback control and switching amplifiers such as voltage source inverters. Typically, the feedback control is based on an outer position control and an inner current control. The inner current control generates PWM (Pulse Width Modulation) signals to the switching amplifier which provides the desired currents as indicated by the outer position control.

For the practical application of such systems in industrial rotating machinery, the output of these amplifiers must vary in the order of thousands of cycles per second in order to maintain or adjust the desired position. Active magnetic bearings may e.g. be used in high speed rotation applications, especially in high power compressors for oil and gas applications.

SUMMARY

Standard motor drives have been widely used and are thoroughly verified in industry for long time and could be a good choice as switching amplifiers for active magnetic bearings. However, since standard motor drives use IGBT's (Insulated-Gate Bipolar Transistors), they have limited maximum switching frequency, e.g. up to about 16 kHz for drive ACS M1 commercially available from ABB. This limits naturally the force bandwidth of active magnetic bearings when current control based on PWM is used.

The fixed switching frequency used in PWM limits the amplifier bandwidth, because the amplifier has to wait for the next switching period to respond to changes. The limited amplifier bandwidth in turn limits the force bandwidth.

For the ABB drive ACS M1 with a switching frequency of up to about 16 kHz, the amplifier bandwidth can be around 300 to 400 Hz, which means that the maximum motor speed will be limited to around 20000 rpm or even lower because of amplifier delay. This means that the applicability for high speed applications is reduced significantly.

An aim of the present invention is to provide an electromagnetic bearing arrangement and a method of operating an electromagnetic bearing arrangement, wherein the force bandwidth can be high when using standard motor drives as switching amplifiers.

According to one aspect of the invention, there is provided an electromagnetic bearing arrangement for a rotating equipment, the electromagnetic bearing arrangement comprising an electromagnet, an amplifier arrangement based on IGBT switches, a power supply for powering the amplifier arrangement, a controller for controlling the amplifier arrangement to operate the electromagnet, and a position sensor for repeatedly measuring the position of the rotating equipment in relation to the electromagnet. The controller comprises a position control module and a direct force control module.

The position sensor is operatively connected to the position control module to repeatedly forward the measured position of the rotating equipment in relation to the electromagnet to the position control module and the position control module is configured to repeatedly calculate a force reference based on the measured position of the rotating equipment in relation to the electromagnet.

Further, the position sensor is operatively connected to the direct force control module to repeatedly forward the measured position of the rotating equipment in relation to the electromagnet to the direct force control module.

The electromagnetic bearing arrangement comprises a sensor arrangement for repeatedly measuring at least one parameter indicative of a force exerted by the electromagnet and is operatively connected to the direct force control module to repeatedly forward the measured parameter indicative of the force exerted by the electromagnet to the direct force control module.

The direct force control module is configured to repeatedly calculate an estimated force exerted by the electromagnet, each time based on the last measured position of the rotating equipment in relation to the electromagnet and the last measured parameter indicative of the force exerted by the electromagnet, to repeatedly compare the last calculated force reference with the last estimated force exerted by the electromagnet, and to control the amplifier arrangement to operate the electromagnet by switch commands determined based on the comparisons.

The sensor arrangement for measuring at least one parameter indicative of a force exerted by the electromagnet may comprises one or more current sensors and optionally one or more voltage sensors, and the at least one parameter indicative of a force exerted by the electromagnet may comprise one or more currents and/or one or more voltages of the amplifier arrangement.

The direct force control module may comprise a flux observer submodule configured to repeatedly calculate a flux of the electromagnet, each time based on the last measured position of the rotating equipment in relation to the electromagnet and the last measured parameter indicative of the force exerted by the electromagnet; and a force calculator submodule configured to repeatedly calculate the estimated force exerted by the electromagnet, each time based on the last calculated flux of the electromagnet.

Additionally, or alternatively, the direct force control module may comprise a force comparator submodule configured to compare the last calculated force reference with the last estimated force exerted by the electromagnet and to provide a force status based on the comparison.

Yet additionally, or alternatively, the direct force control module may comprise a gate selection table submodule configured to provide the switch commands for the amplifier arrangement based on the current force status. The gate selection table submodule may hold a table comprising force statuses, and for each force status a switch command to be used and the gate selection table submodule may be configured to provide the switch command for the amplifier arrangement by referring to the table.

The direct control of the electromagnetic bearing arrangement as disclosed herein is performed constantly throughout the operation of the electromagnetic bearing arrangement. Hereby, switching commands can be provided for the amplifier arrangement constantly during operation, so switching may be performed whenever required and not only at certain given instants.

By such control, the fixed frequency PWM modulation used in other solutions based on standard motor drives is avoided. Instead the switching instants are chosen freely in order to achieve the best output response.

In one embodiment, the magnetic bearing arrangement comprises a second electromagnet, wherein the direct force control module of the controller is configured to control the amplifier arrangement to operate the second electromagnet by a switch commands determined based on the comparisons. The two electromagnets are preferably arranged in fix positions opposite to one another with respect to the rotating equipment which is suspended.

The direct force control module (e.g. the force calculator submodule) may here be configured to calculated the sum of the force exerted by the two electromagnets based on measured currents through the coils of the electromagnets and the position of the rotating equipment in relation to the electromagnets, e.g. via calculation of the fluxes of the two electromagnets (e.g. performed by the flux observer submodule).

Additionally, the magnetic bearing arrangement may comprise a third and a fourth electromagnet fixedly arranged with respect to one another; a second position sensor for repeatedly measuring the positions of the third electromagnet (and/or the fourth electromagnet); and a second sensor arrangement for repeatedly measuring at least one parameter indicative of a force exerted by the third electromagnet (and/or the fourth electromagnet).

The second position sensor may be operatively connected to the position control module of the controller to repeatedly forward the measured position of the rotating equipment in relation to the third electromagnet (and/or fourth electromagnet) to the position control module. The same may be repeatedly forwarded to the direct force control module. The second position control module may be configured to repeatedly calculate a second force reference, each time based on the measured position of the rotating equipment in relation to the third electromagnet (and/or the fourth electromagnet).

The second sensor arrangement may be operatively connected to the direct force control module of the controller to repeatedly forward the measured at least one parameter indicative of the force exerted by the third electromagnet (and/or the fourth electromagnet) to the direct force control module. The at least on parameter include preferably the currents flown through the coils of the third and fourth electromagnets and advantageously the position of the rotating equipment in relation to the third and fourth electromagnets.

The direct force control module of the controller may be configured to repeatedly calculate an estimated force exerted by the third electromagnet (and/or fourth electromagnet), each time based on the measured parameter indicative of the force exerted by the third electromagnet (and/or the fourth electromagnet) and optionally based on the measured position of the rotating equipment in relation to the third electromagnet (and/or the fourth electromagnet), to repeatedly compare the second force reference with the estimated force exerted by the third electromagnet (and/or the fourth electromagnet), and to repeatedly control the amplifier arrangement to operate the third and fourth electromagnets by a switch command determined based on the comparison of the second force reference with the estimated force exerted by the third electromagnet (and/or the fourth electromagnet).

In one embodiment, the amplifier arrangement comprises, for each electromagnet to be operated, two switching legs, each switching leg having one IGBT switch and one diode in series, and opposite ends of each switching leg being electrically connected to the power supply, wherein the coil of the electromagnet is electrically connected to the junction between the IGBT switch and the diode of each switching leg.

Additionally, or alternatively, the amplifier arrangement may comprise, for at least one electromagnet to be operated, two switching legs, each switching leg having two IGBT switches in series, each of the IGBT switches comprising an IGBT and a diode connected in parallel, and opposite ends of each switching leg being electrically connected to the power supply, wherein the coil of the electromagnet is electrically connected to the junction between the IGBT switches of each switching leg. Such amplifier arrangement provides redundancy since normally only two of the four IGBT's have to be switched during operation.

The outer loop consists of the common position control. It gives force commands to the force controller. The force controller compares an estimate of the force exerted by the electromagnet with the commanded force and the result is sent to a selection table that determines the appropriate switch behavior. The force estimation can be designed in different ways, such as based on measurement of the currents, optionally the voltages, and the displacement.

According to another aspect of the invention there is provided an electromagnetic bearing arrangement for a rotating equipment, the electromagnetic bearing arrangement comprising two oppositely located electromagnets with respect to a rotating equipment to be suspended; an amplifier arrangement based on IGBT (Insulated-Gate Bipolar Transistor) switches; a power supply for powering the amplifier arrangement; a controller for controlling the amplifier arrangement to operate the electromagnets; and a position sensor for measuring the position of the rotating equipment in relation to the electromagnets. The controller comprises a position control module and a direct force control module, wherein the position sensor is operatively connected to both modules to forward the measured position of the rotating equipment in relation to the electromagnet thereto. The position control module is configured to calculate a force reference based on the measured position of the rotating equipment in relation to the electromagnets.

The electromagnetic bearing arrangement comprises a sensor arrangement for measuring currents flown through the electromagnets and is operatively connected to the direct force control module to forward the measured currents to the direct force control module, wherein the direct force control module is configured to calculate an estimated sum of forces exerted by the electromagnets on the rotating equipment to be suspended based on the measured currents and the measured position of the rotating equipment in relation to the electromagnets, to compare the force reference with the estimated sum of forces exerted by the electromagnet, and to control the amplifier arrangement to operate the electromagnet by a switch command determined based on the comparison.

In other regards, this aspect of the invention may be similar to the previous aspect of the invention.

According to yet another aspect of the invention there is provided a method of operating an electromagnetic bearing arrangement comprising an electromagnet; an amplifier arrangement based on IGBT (Insulated-Gate Bipolar Transistor) switches; a power supply for powering the amplifier arrangement; and a position sensor for measuring the position of the rotating equipment in relation to the electromagnet.

According to the method, the position of the rotating equipment in relation to the electromagnet is measured by the position sensor; a force reference is calculated based on the measured position of the rotating equipment in relation to the electromagnet; at least one parameter indicative of a force exerted by the electromagnet is measured; an estimated force exerted by the electromagnet is calculated based on the measured position of the rotating equipment in relation to the electromagnet and the measured parameter indicative of the force exerted by the electromagnet; the force reference is compared with the estimated force exerted by the electromagnet; and the amplifier arrangement is controlled to operate the electromagnet by a switch command determined based on the comparison.

In one embodiment, a flux of the electromagnet is calculated based on the measured parameter indicative of the force exerted by the electromagnet; the estimated force exerted by the electromagnet is calculated based on the flux of the electromagnet; a force status based on the comparison of the force reference with the estimated force exerted by the electromagnet is provided; and the switch command for the amplifier arrangement is provided based on the force status by means of referring to a table comprising force statuses, and for each force status a switch command to be used.

The method steps above are performed constantly or repeatedly during operation of the electromagnetic bearing arrangement to provide switch commands whenever required, e.g. when the force status is changed. Hereby, a direct control is achieved and the switching instants are not required to be at certain instants as is the case for PWM based control methods.

The present invention provides for electromagnetic bearing arrangements and methods of operating an electromagnetic bearing arrangement, which can be used for high speed applications while still ordinary motor drives with IGBT's are used as amplifier arrangements.

Maintenance and updating of the magnetic bearing arrangement can be made to low cost. When using specifically designed prior art amplifiers, several designs have to be developed and updated.

Legacy guarantees to users can more easily be made since the switching amplifier can be implemented by a standard component.

The cost of the magnetic bearing arrangement will be low. The commercially available motor drive mentioned above is equipped with a controller for speed/torque control, etc. The controller for the magnetic bearing arrangement could be implemented using this existing controller, wherein the overall cost of the magnetic bearing arrangement would be kept low.

The support costs can be low since the same service personal which have motor drives serviced all over the world, can be used to have the magnetic bearing arrangements serviced as well.

Further characteristics of the invention and advantages thereof will be evident from the following detailed description of embodiments of the invention.

DETAILED DESCRIPTION

Figure 1:
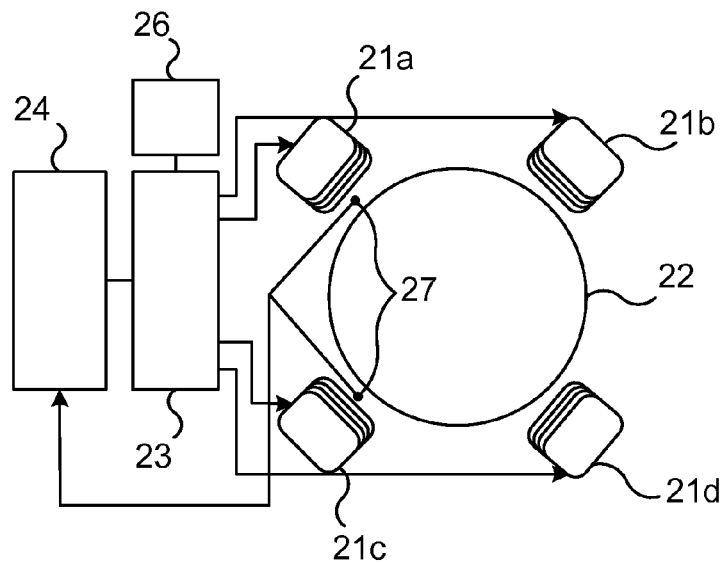
FIG. 1 illustrates schematically an electromagnetic bearing arrangement according to an embodiment of the invention.

FIG. 1 illustrates schematically an electromagnetic bearing arrangement according to an embodiment of the invention. The electromagnetic bearing arrangement comprises four electromagnets 21a-d arranged e.g. equiangularly around a rotating equipment 22 such as a rotor of an electric machine. The rotating equipment 22 may be oriented such that its rotation axis is horizontal and the four electromagnets 21a-d may be arranged 45 degrees off the vertical and horizontal axis such that not a sole electromagnet will be responsible for counteracting the gravitational forces of the rotating equipment. Thus, the two electromagnets 21a-b may be referred to as upper electromagnets and the two electromagnets 21c-d may be referred to as lower electromagnets.

It shall be appreciated that the electromagnetic bearing arrangement of the invention may comprise any number of electromagnets arranged in any suitable configuration.

The electromagnetic bearing arrangement further comprises an amplifier arrangement 23 for operating the electromagnets 21a-d, a power supply 26 for supplying the amplifier arrangement 23 with power, and a controller 24 for controlling the amplifier arrangement 23 to operate the electromagnets 21a-d. The controller 24 may also be powered by the power supply 26.

Sensors 27 such as position sensors may be provided for measuring the positions of the electromagnets 21a-d and for forwarding the measured positions to the controller 24, which controls the operation of the amplifier arrangement 23 and thus the electromagnets 21a-d in response thereto, thus providing feedback control.

Figure 2:
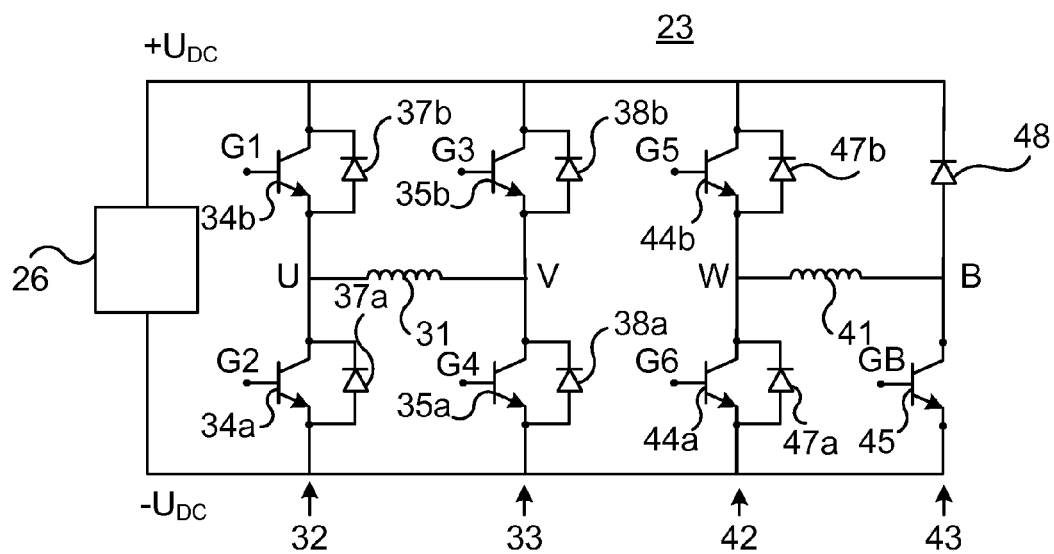
FIG. 2 is a diagrammatic illustration of an amplifier arrangement of the electromagnetic bearing arrangement.

For exciting two 21a, 21d of the electromagnets 21a-d, the amplifier arrangement 23 may comprise a first switching leg pair 32, 33 and a second switching leg pair 42, 43 as being illustrated in FIG. 2. Each switching leg 32, 33 of the first pair has two switches 34a-b, 35a-b, and a coil 31 of a first electromagnet 21a is electrically connected to the junctions U and V between the switches 34a-b, 35a-b of each of the switching legs 32, 33 of the first pair. Each of switches 34a-b, 35a-b is provided with a diode 37a-b, 38a-b for bypassing the switch when the switch is in an off state.

The switching leg 42 of the second pair has two switches 44a-b whereas the switching leg 43 has one switch 45 and one diode 48. A coil 41 of a second electromagnet 21d is electrically connected to the junctions W and B between the switches 44a-b of the switching leg 42 of the second pair and between the switch 45 and the diode 48 of the switching leg 43 of the second pair. Each of switches 44a-b of the switching leg 42 is provided with a diode 47a-b for bypassing the switch when the switch is in an off state.

The power supply 26 is electrically connected to opposite ends of each of the switching legs 32, 33, 42, 43 of the first and second pair. Motor drives ACS M1 and ACS 850 commercially available from ABB comprise the topology of the amplifier arrangement of FIG. 2 and may be used in this invention.

The switches 34a-b, 35a-b, 44a-b, and 45 are controlled by the controller 24 via the control terminals G1-G6 and GB. The switches 34a-b, 35a-b, 44a-b, and 45 are IGBT's (Insulated-Gate Bipolar Transistors).

It shall be appreciated that the controller 24 may be configured to control the amplifier arrangement of FIG. 2 to generate appropriate voltages over the first electromagnet 21a by using only two switches at a time: either switches 34a and 35b or switches 34b and 35a. This switching redundancy is not obtained in the right hand part of FIG. 2. Therefore, the switch 44a and the diode 47b of the switch leg 42 may, in principle, be dispensed with. If the switch 44a is present, it should be kept in an off state during operation.

Obviously, two of the amplifier arrangement of FIG. 2 are required for exciting all electromagnets 21a-d of the electromagnetic bearing arrangement of FIG. 1.

Figure 3:
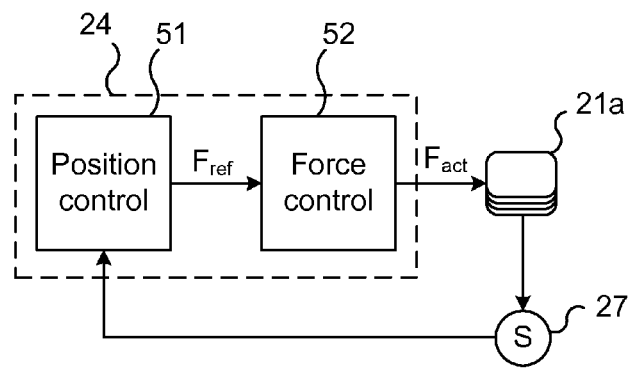
FIG. 3 is a schematic illustration of a sensor and control structure implemented in the electromagnetic bearing arrangement of FIG. 1.

FIG. 3 is a schematic illustration of a sensor and control structure implemented in the electromagnetic bearing arrangement of FIG. 1. The controller 24 comprises a position control module 51, to which the position sensors 27 is operatively connected (only one of the position sensors 27 is shown in FIG. 3), such that the position control module 51 can determine force commands based on the measured positions of the electromagnets (only electromagnet 21a is shown) to provide the position based feedback control. Further, the controller 24 comprises a direct force control module 52 which is configured to control the amplifier arrangement to operate the electromagnets 21a-d by switch commands determined based on the force commands and estimated forces exerted by the electromagnets.

Figure 4:
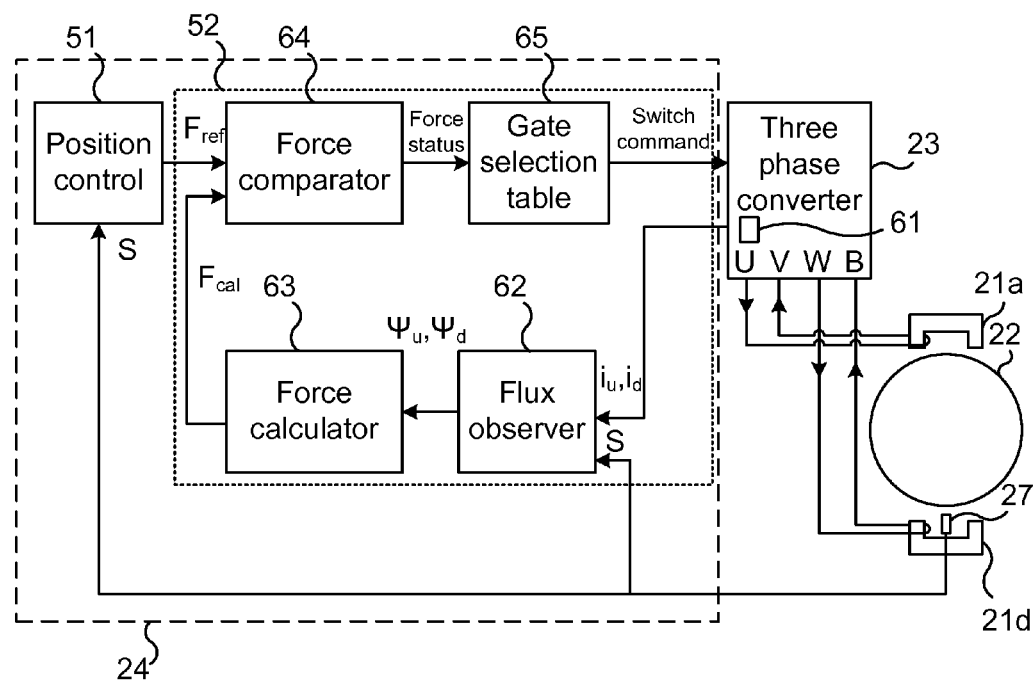
FIG. 4 illustrates schematically part of the electromagnetic bearing arrangement of FIG. 1, wherein submodules of the control arrangement thereof are explicitly illustrated.

FIG. 4 illustrates schematically part of the electromagnetic bearing arrangement of FIG. 1, wherein the controller 24 is further detailed. Note that only two 21a, 21d of the electromagnets 21a-d and only one of the amplifier arrangement 23 of FIG. 2 are shown in FIG. 4.

The control will be described with reference to the electromagnets 21a and 21d.

The position sensor 27 is operatively connected to the position control module 51 and the direct force control module 52 to forward the measured position S rotating equipment 22 in relation to the electromagnet 21a to these modules. Since the electromagnets 21a and 21d are arranged fixedly with respect to one another, the position of the rotating equipment in relation to the electromagnet 21a gives also the position of the rotating equipment in relation to the electromagnet 21d.

The position control module 51 is configured to calculate a force reference $F_{ref}$ or force commands based on the measured position S of the electromagnets 21a and 21d.

The electromagnetic bearing arrangement comprises a sensor arrangement 61 for measuring at least one parameter indicative of a force exerted by the electromagnets 21a and 21d and is operatively connected to the direct force control module 52 to forward the measured parameter indicative of the force exerted by the electromagnets 21a and 21d to the direct force control module 52.

The sensor arrangement 61 may comprise one or more current sensors and/or one or more voltage sensors, and the at least one parameter indicative of a force exerted by the electromagnet 21a may comprise one or more currents and optionally voltages of the amplifier arrangement 23. In one embodiment, the at least one parameter indicative of a force exerted by the electromagnets 21a and 21d comprises the currents $i_u$ and $i_d$ of the coils 31, 41 of the electromagnets 21a and 21d.

The direct force control module 52 may be configured to calculate an estimated force $F_{cal}$ exerted by the electromagnets 21a and 21d based on the measured at least one parameter indicative of the force exerted by the electromagnets 21a and 21d, and the measured position S of the electromagnets 21a and 21d. The estimated force $F_{cal}$ is preferably the sum of the forces exerted by the electromagnets 21a and 21d.

The direct force control module 52 is further configured to compare the force reference $F_{ref}$ with the estimated force $F_{cal}$ exerted by the electromagnets 21a and 21d, and to control the amplifier arrangement 23 to operate the electromagnet 21a and 21d by a switch command determined based on the comparison.

More in detail, the direct force control module 52 may comprise a flux observer submodule 62 configured to calculate a flux $\Psi_u$, $\Psi_l$ of the electromagnets 21a and 21d based on the measured currents; and a force calculator submodule 63 configured to calculate the estimated force $F_{cal}$ exerted by the electromagnets 21a and 21d based on the flux of the electromagnets 21a and 21d.

Further, the direct force control module 52 may comprise a force comparator submodule 64 configured to compare the force reference $F_{ref}$ with the estimated force $F_{cal}$ exerted by the electromagnets 21a and 21d, and to provide a force status based on the comparison.

A gate selection table submodule 65 is configured to provide a switch command for the amplifier arrangement 23 based on the force status.

The gate selection table submodule 65 may hold a table comprising force statuses, and for each force status, a switch command to be used, and wherein the gate selection table submodule 65 is configured to provide the switch command for the amplifier arrangement 23 by referring to the table.

For example, the force comparator submodule 64 may be configured to compare the force reference $F_{ref}$ with the estimated force $F_{cal}$ exerted by the electromagnets 21a and 21d, and to provide a force status based on the comparison in accordance with the below:

$$F_s = \begin{cases} +F_{DC} & F_{ref} - F_{cal} > F_e \\ -F_{DC} & F_{ref} - F_{cal} < -F_e \\ 0 & -F_e \leq F_{ref} - F_{cal} \leq F_e \end{cases}$$

where $F_s$ is the force status, and $F_e$ is a predefined hysteresis force level depending on the particular application to be used.

One example of a table comprising force statuses, and for each force status, a switch command to be used as held by the gate selection table submodule 65 is given by Table 1.

TABLE 1

Example table comprising force statuses, and for each force status, a switch command

| $F_s$ | G1 | G2 | G3 | G4 | G5 | G6 | GB |
|---|---|---|---|---|---|---|---|
| $+F_{DC}$ | 1 | 0 | 0 | 1 | 0 | 0 | 0 |
| $-F_{DC}$ | 0 | 0 | 0 | 0 | 1 | 0 | 1 |
| 0 | 0 | 0 | 0 | 1 | 0 | 0 | 1 |

Control of the other two electromagnets 21b and 21c of the electromagnetic bearing arrangement of FIG. 1 is made in a corresponding manner.

It shall be appreciated that the control disclosed above is performed constantly during operation to provide switch commands for the amplifier arrangement. Hereby, switching may be performed when desired, e.g. when ever the force status is changed.

Hereby, the fixed frequency PWM modulation used in other solutions based on standard motor drives is avoided. Instead the switching instants are chosen freely in order to achieve the best output response. This is similar to, for instance, direct torque control (DTC) schemes for motor control.

The invention has mainly been described above with reference to a few embodiments. However, as is readily appreciated by a person skilled in the art, other embodiments than the ones disclosed above are equally possible within the scope of the invention, as defined by the appended patent claims. In particular, it shall be appreciated that the above disclosed amplifier arrangement may differ as long as it is based on an ordinary motor drive implemented with IGBT's (Insulated-Gate Bipolar Transistors).

The invention claimed is:

1. An electromagnetic bearing arrangement for a rotating equipment, the electromagnetic bearing arrangement comprising an electromagnet; an amplifier arrangement based on IGBT switches; a power supply for powering the amplifier arrangement; a controller for controlling the amplifier arrangement to operate the electromagnet; and a position sensor for measuring the position of the rotating equipment in relation to the electromagnet, characterized in that the controller comprises a position control module and a direct force control module, wherein the
   the position sensor is operatively connected to the position control module to forward the measured position (S) of the rotating equipment in relation to the electromagnet;
   the position control module is configured to calculate a force reference ($F_{ref}$) based on the measured position of the rotating equipment in relation to the electromagnet;
   the position sensor is operatively connected to the direct force control module to forward the measured position of the rotating equipment in relation to the electromagnet to the direct force control module; and
   the electromagnetic bearing arrangement comprises a sensor arrangement for measuring at least one parameter ($i_u$, $i_d$) indicative of a force exerted by the electromagnet and is operatively connected to the direct force control module to forward the measured parameter indicative of the force exerted by the electromagnet to the direct force control module; and
   the direct force control module is configured to calculate an estimated force ($F_{cal}$) exerted by the electromagnet based on the measured position of the rotating equipment in relation to the electromagnet and the measured parameter indicative of the force exerted by the electromagnet, to compare the force reference with the estimated force exerted by the electromagnet, and to control the amplifier arrangement to operate the electromagnet by a switch command determined based on said comparison.

2. The arrangement of claim 1 wherein the sensor arrangement for measuring at least one parameter indicative of a force exerted by the electromagnet comprises one or more current sensors and the at least one parameter indicative of a force exerted by the electromagnet comprises one or more currents of the amplifier arrangement.

3. The arrangement of claim 1 wherein the sensor arrangement for measuring a parameter indicative of a force exerted by the electromagnet comprises one or more voltage sensors and the at least one parameter indicative of a force exerted by the electromagnet comprises one or more voltages of the amplifier arrangement.

4. The arrangement of claim 1 wherein the direct force control module comprises
   a flux observer submodule configured to calculate a flux ($\Psi_u$, $\Psi_i$) of the electromagnet based on the measured parameter indicative of the force exerted by the electromagnet; and
   a force calculator submodule configured to calculate the estimated force ($F_{cal}$) exerted by the electromagnet based on the flux of the electromagnet.

5. The arrangement of claim 1 wherein the direct force control module comprises a force comparator submodule configured to compare the force reference with the estimated force exerted by the electromagnet, to provide a force status based on the comparison, and to determine the a switch command based on the force status.

6. The arrangement of claim 5 wherein the direct force control module comprises a gate selection table submodule configured to provide the switch command for the amplifier arrangement based on the force status.

7. The arrangement of claim 6 wherein the gate selection table submodule holds a table comprising force statuses, and, for each force status, a switch command to be used, and wherein the gate selection table submodule is configured to provide the switch command for the amplifier arrangement by referring to the table.

8. The arrangement of claim 1 comprising a second electromagnet, wherein the direct force control module of the controller is configured to control the amplifier arrangement to operate the second electromagnet by a switch command determined based on said comparison.

9. The arrangement of claim 8 comprising a third and a fourth electromagnet; a second position sensor for measuring the position of the rotating equipment in relation to the third and fourth electromagnets; and a second sensor arrangement for measuring at least one parameter indicative of a force exerted by the third and fourth electromagnets, wherein the
   the second position sensor is operatively connected to the position control module of the controller to forward the measured position of the rotating equipment in relation to the third and fourth electromagnets to the position control module;
   the second position control module is configured to calculate a second force reference based on the measured position of the rotating equipment in relation to the third and fourth electromagnets;
   the position sensor is operatively connected to the direct force control module to forward the measured position of the rotating equipment in relation to the third and fourth electromagnets to the direct force control module;
   the second sensor arrangement is operatively connected to the direct force control module of the controller to forward the measured parameter indicative of the force exerted by the third and fourth electromagnets to the direct force control module; and
   the direct force control module of the controller is configured to calculate an estimated force exerted by the third and fourth electromagnets based on the measured position of the rotating equipment in relation to the third and fourth electromagnets and the measured parameter indicative of the force exerted by the third and fourth electromagnets, to compare the second force reference with the estimated force exerted by the third and fourth electromagnets, and to control the amplifier arrangement to operate the third and fourth electromagnets by a switch command determined based on the comparison of the second force reference with the estimated force exerted by the third and fourth electromagnets.

10. The arrangement of claim 1 wherein the amplifier arrangement comprises, for each electromagnet to be operated, two switching legs, each switching leg having one IGBT switch and one diode in series, and opposite ends of each switching leg being electrically connected to the power supply, wherein the coil of the electromagnet is electrically connected to the junction between the IGBT switch and the diode of each switching leg.

11. The arrangement of claim 1 wherein the amplifier arrangement comprises, for at least one electromagnet to be operated, two switching legs, each switching leg having two IGBT switches in series, each of the IGBT switches comprising an IGBT and a diode connected in parallel, and opposite ends of each switching leg being electrically connected to the power supply, wherein the coil of the electromagnet is electrically connected to the junction between the IGBT switches of each switching leg.

12. A method of operating an electromagnetic bearing arrangement for a rotating equipment, the electromagnetic bearing arrangement comprising an electromagnet; an amplifier arrangement based on IGBT switches; a power supply for powering the amplifier arrangement; and a position sensor for measuring the position of the rotating equipment in relation to the electromagnet, characterized by the steps of:

measuring the position (S) of the rotating equipment in relation to the electromagnet by the position sensor;

calculating a force reference ($F_{ref}$) based on the measured position of the rotating equipment in relation to the electromagnet;

measuring at least one parameter ($i_u$, $i_d$) indicative of a force exerted by the electromagnet;

calculating an estimated force ($F_{cal}$l) exerted by the electromagnet based on the measured position of the rotating equipment in relation to the electromagnet and the measured parameter indicative of the force exerted by the electromagnet;

compare the force reference with the estimated force exerted by the electromagnet; and controlling the amplifier arrangement to operate the electromagnet by a switch command determined based on said comparison.

13. The method of claim 12 comprising:

calculating a flux ($\Psi_u$, $\Psi_i$) of the electromagnet based on the measured parameter indicative of the force exerted by the electromagnet;

calculating the estimated force ($F_{cal}$) exerted by the electromagnet based on the flux of the electromagnet.

14. The method of claim 12 comprising providing a force status based on the comparison of the force reference with the estimated force exerted by the electromagnet; and providing the switch command for the amplifier arrangement based on the force status.

15. The method of claim 14 wherein the switch command for the amplifier arrangement is provided by means of referring to a table comprising force statuses, and for each force status a switch command to be used.

* * * * *